United States Patent
Kumar et al.

(10) Patent No.: US 10,498,498 B2
(45) Date of Patent: Dec. 3, 2019

(54) TECHNIQUES FOR AUTONOMOUS USER EQUIPMENT TUNE-AWAY OPERATIONS

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 15/798,863

(22) Filed: Oct. 31, 2017

(65) Prior Publication Data

US 2019/0132088 A1    May 2, 2019

(51) Int. Cl.
*H04L 1/18* (2006.01)
*H04W 64/00* (2009.01)
*H04W 84/04* (2009.01)

(52) U.S. Cl.
CPC ........... *H04L 1/1812* (2013.01); *H04W 64/00* (2013.01); *H04W 84/042* (2013.01)

(58) Field of Classification Search
CPC .... H04L 1/1812; H04L 1/1887; H04W 64/00; H04W 84/042
USPC .... 455/404.2, 414.1, 425, 456.1–457, 550.1; 370/328
See application file for complete search history.

(56) References Cited

U.S. PATENT DOCUMENTS

| | | | |
|---|---|---|---|
| 7,542,472 B1 * | 6/2009 | Gerendai | H04L 1/1635 370/338 |
| 8,843,175 B2 | 9/2014 | Nukala et al. | |
| 9,204,353 B2 | 12/2015 | Hsu et al. | |
| 9,253,677 B2 | 2/2016 | Siomina | |
| 2012/0020310 A1 * | 1/2012 | Ji | H04W 48/16 370/329 |
| 2014/0094188 A1 * | 4/2014 | Kazmi | G01S 5/0242 455/456.1 |
| 2015/0092708 A1 * | 4/2015 | Su | H04W 76/16 370/329 |
| 2015/0333890 A1 | 11/2015 | Yang et al. | |
| 2017/0094576 A1 | 3/2017 | Kazmi et al. | |

FOREIGN PATENT DOCUMENTS

WO    WO-2010048998 A1 *    5/2010    ........... H04L 1/1883

* cited by examiner

*Primary Examiner* — Michael Y Mapa
(74) *Attorney, Agent, or Firm* — Thien T. Nguyen (57) ABSTRACT

Techniques are provided for use by an user equipment (UE) to perform an autonomous tune-away period of operation. The techniques allow the UE to transmit an indication of reception to a first base station during the autonomous tune-away period of operation during which the UE may be configured to receive signals from a second base station. The indication of reception may correspond to a signal transmitted or to be transmitted by the first base station during the autonomous tune-away period of operation. The indication of reception transmitted during the autonomous tune-away period of time may influence signals transmitted by the first base station after an end of the autonomous tune-away period of operation.

26 Claims, 4 Drawing Sheets

TECHNIQUES FOR AUTONOMOUS USER EQUIPMENT TUNE-AWAY OPERATIONS

BACKGROUND

Field

Subject matter disclosed herein relates to wireless signaling, and more particularly to techniques for use during autonomous user equipment tune-away operations.

Information

The position of a user equipment (UE), such as a cellular telephone, portable computer, machine, vehicle, or other like device, may be useful or essential to a number of applications including emergency communication, navigation, direction finding, asset tracking, Internet service, or the like. The position of a UE may be estimated based on information gathered from various systems. In a wireless network implemented according to 4G (also referred to as Fourth Generation) Long Term Evolution (LTE) radio access, for example, a transmitting device (e.g., a base station device) may transmit a positioning reference signal (PRS). A UE acquiring (receiving) PRSs transmitted by different base station devices may determine or calculate signal-based measurements that may be used in computing a position estimate of the UE, for example, by applying observed time difference of arrival (OTDOA) techniques.

In certain instances, to obtain applicable signal-based measurements and/or other pertinent information, a UE may need to receive signals from different transmitting devices (e.g., different base stations, etc.), which may require the UE to tune a receiver to different channels/bands. Hence, a UE may need to "tune-away" its receiver from time to time to receive different wireless signals. To possibly improve network efficiency, a procedure may be provided through with a network resource (e.g., a serving base station) is made aware, possibly after providing consent or otherwise supporting applicable scheduling, that the UE will briefly tune-away. Thus, in certain instances a UE may perform a coordinated tune-away operation as understood by the supporting network. A coordinated tune-away operation may, for example, allow a network to delay transmitting data to the UE during the period of time that the UE is tuned-away and unable to receive such transmitted information.

There may be instances, however, wherein a UE may desire to perform a tune-away operation that is not coordinated in some manner with the network. Such an autonomous tune-away operation may reduce the network's efficiency at times, for example, if the network is required to retransmit data units to the UE which were not received during the autonomous tune-away operation. For this and other reasons, it may be beneficial to provide improved techniques for UE autonomous tune-away operations.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Reference is made in the following detailed description to accompanying drawings, which form a part hereof, wherein like numerals may designate like parts throughout that are identical, similar and/or analogous. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. Therefore, the following detailed description is not to be taken to limit claimed subject matter and/or equivalents.

SUMMARY

In accordance with certain aspects, a method may be provided for use in a user equipment (UE). The method may comprises, at the UE, performing an autonomous tune-away period of operation, receiving a first set of data units of a positioning signal transmitted by a first base station prior to a start of the autonomous tune-away period of operation, transmitting an indication of reception to the first base station during the autonomous tune-away period of operation, the indication of reception corresponding to a second set of data units of the positioning signal transmitted or to be transmitted by the first base station during the autonomous tune-away period of operation, and receiving a third set of data units of the of positioning signal transmitted by the first base station after an end of the autonomous tune-away period of operation, the third set of data units having been transmitted by the first base station in response to the indication of reception transmitted during the autonomous tune-away period of operation.

In accordance with certain other aspects, a UE may be provided which comprises a receiver, a transmitter, and a processing unit coupled to the receiver and the transmitter. The processing unit may be configured to obtain, via the receiver, a first set of data units of a positioning signal transmitted by a first base station, prior to a start of an autonomous tune-away period of operation, and perform the autonomous tune-away period of operation to obtain, via the receiver, data units of a signal transmitted by a second base station during at least a portion of the autonomous tune-away period of operation. The processing unit may be further configured to initiate transmission, via the transmitter, of an indication of reception to the first base station during the autonomous tune-away period of operation, the indication of reception corresponding to a second set of data units of the positioning signal transmitted or to be transmitted by the first base station during the autonomous tune-away period of operation, and obtain, via the transmitter, a third set of data units of the of positioning signal transmitted by the first base station after an end of the autonomous tune-away period of operation, the third set of data units having been transmitted by the first base station in response to the indication of reception transmitted during the autonomous tune-away period of operation.

In accordance with still other aspects, an apparatus may be provided for use in a UE which comprises means for performing an autonomous tune-away period of operation, means for receiving a first set of data units of a positioning signal transmitted by a first base station, prior to a start of the autonomous tune-away period of operation, means for transmitting an indication of reception to the first base station during the autonomous tune-away period of operation, the indication of reception corresponding to a second set of data units of the positioning signal transmitted or to be transmitted by the first base station during the autonomous tune-away period of operation, and means for receiving a third set of data units of the of positioning signal transmitted by the first base station after an end of the autonomous tune-away period of operation, the third set of data units having been transmitted by the first base station in response to the indication of reception transmitted during the autonomous tune-away period of operation.

In accordance with yet other aspects, an article of manufacture may be provided which comprises a non-transitory computer readable medium having stored therein instructions executable by a processing unit of UE. The instructions may be executable by the processing unit to perform an autonomous tune-away period of operation, obtain a first set of data units of a positioning signal transmitted by a first base station, prior to a start of the autonomous tune-away period of operation, provide an indication of reception to the first base station during the autonomous tune-away period of operation, the indication of reception corresponding to a second set of data units of the positioning signal transmitted or to be transmitted by the first base station during the autonomous tune-away period of operation, and obtain a third set of data units of the of positioning signal transmitted by the first base station after an end of the autonomous tune-away period of operation, the third set of data units having been transmitted by the first base station in response to the indication of reception transmitted during the autonomous tune-away period of operation.

DETAILED DESCRIPTION

Various example techniques are presented herein that may be implemented in a UE to provide techniques supportive of user equipment autonomous tune-away operations.

A user equipment (UE) may tune away its receiver from time to time, for example, to receive wireless signals from different transmitting devices. For example, in an LTE or other like network, a UE may need to tune away briefly from receive/measure positioning reference signals (PRSs) signals from a serving base station to a neighboring base station.

In certain instances a tune away (TA) operation of a UE may be autonomous in that there is not specific coordination or planning with network elements. Hence, a first base station may not be aware that the UE has tuned away to 'listen' to a second base station and as such may continue to transmit messages (e.g., comprising protocol data units (PDUs), or the like) during all or part of the autonomous TA period of time. Such continued transmission may be inefficient in certain instances, for example, as PDUs transmitted during the autonomous TA may need to be retransmitted one or more times once the UE has returned following an autonomous TA operation. In a particular example, such a disruption in reception by a UE may be troublesome for PDUs that are transmitted in accordance with a Hybrid-Automatic Repeat Request (HARQ) operation or other like transmission scheme that rely on the UE to provide timely reception feedback (e.g., in the form of acknowledgements (ACKs) or negative acknowledgements (NACKs)).

With such concerns and others in mind, several example techniques have been developed that may reduce or eliminate certain inefficiencies that may occur due to an autonomous TA period of operation of a receiver of a UE.

By way of example and as described in greater detail herein, a UE that is configured to perform an autonomous TA period of operation may, prior to a start of the autonomous tune-away period of operation, receive a first set of data units of a positioning signal transmitted by a first base station. Although tuned-away with regard to reception as part of the autonomous TA period of operation, the UE may nonetheless be configured to transmit an indication of reception to the first base station which corresponds to a second set of data units of the positioning signal transmitted or to be transmitted by the first base station during the autonomous tune-away period of operation. After an end of the autonomous TA period of operation the UE, having tuned back, may receive a third set of data units of the of positioning signal transmitted by the first base station. Here, for example, the third set of data units is transmitted by the first base station in response to the indication of reception that was transmitted by the UE during the autonomous TA period of operation. In this manner, the UE may provide certain feedback to the first base station which leads the first base station to continue to transmit data units in a manner that may reduce potential inefficiencies caused by the autonomous TA period of operation taken by the UE.

Figure 1:
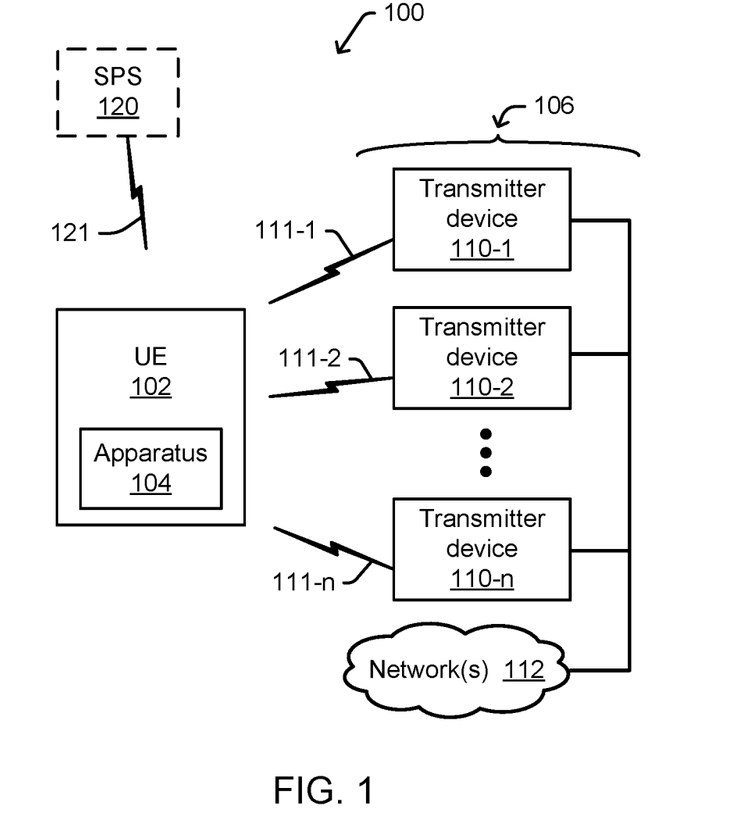
FIG. 1 is a schematic block diagram illustrating certain aspects of a wireless network environment in which a UE may receive signals from transmitting devices, e.g., for use in position estimation, in accordance with certain example implementations.

With this in mind, attention is now drawn to FIG. 1, which is a schematic block diagram illustrating certain aspects of a wireless network environment 100 in which a user equipment (UE) 102 may receive signals (e.g., 111-1, . . . , 111-$n$, 119) from respective transmitting devices (e.g., 110-1, . . . , 110-$n$, 118) for use in position estimation, in accordance with certain example implementations.

As illustrated, UE 102 may comprise an apparatus 104. Apparatus 104 may be configured to support an autonomous TA period of operation in accordance with all or part of one or more of various techniques provided herein.

Wireless network environment 100, as shown in FIG. 1, may comprise at least a portion of at least one wireless network 106, as represented, in part, by a plurality of transmitting devices 110-1, 110-2, through, 110-$n$. As illustrated transmitting device 110-1 may, at times, transmit at least one signal 111-1 that may be received and measured by apparatus 104 for position purposes. Similarly, transmitting devices 110-2 through 110-$n$ may each, at applicable time(s), transmit corresponding signals 111-2, through 111-$n$, each of which may be received and measured by apparatus 104 for position purposes. In certain implementations, two or more of transmitting device 110-1, 110-2, . . . , 110-$n$ may be of the same or similar type(s) of device, for example, base station devices, access point devices, beacon devices, etc. As used herein, the term "base station" is used interchangeable with transmitting device and is intended to represent any applicable type of electronic device that may be used to support position of UE 102, or otherwise provide communicative access between UE 102 and one or more other devices. With this in mind, as shown in FIG. 1, the various transmitting devices in wireless network environment 100 may be operatively coupled to or otherwise possibly interconnected by other devices and resources, represented by network(s) 112. In a particular example, network(s) 112 may comprise all or part of the Internet which may include or otherwise provide connectively to one or more computing platforms.

As further shown in FIG. 1, UE 102 may be configured to receive one or more satellite positioning system (SPS) signals 121 transmitted by one or more space vehicles (SVs) of one or more SPS 120. In certain instances, a position estimate of UE 102 may be based, at least in part, on one or more measurements of one or more SPS signals 121. SPS 120 may comprise a Global Navigation Satellite System (GNSS), such as, e.g., Global Positing System (GPS), GLONASS, Galileo, Beidou, or other like satellite navigation system.

Although signals 111-1, . . . , 111-n have been described as representing example downlink signals that may be used in position estimation, it should also be understood that the same referenced wireless communication connections/links may similarly represent the transmission of other types of downlink or even uplink signals.

Figure 2A:
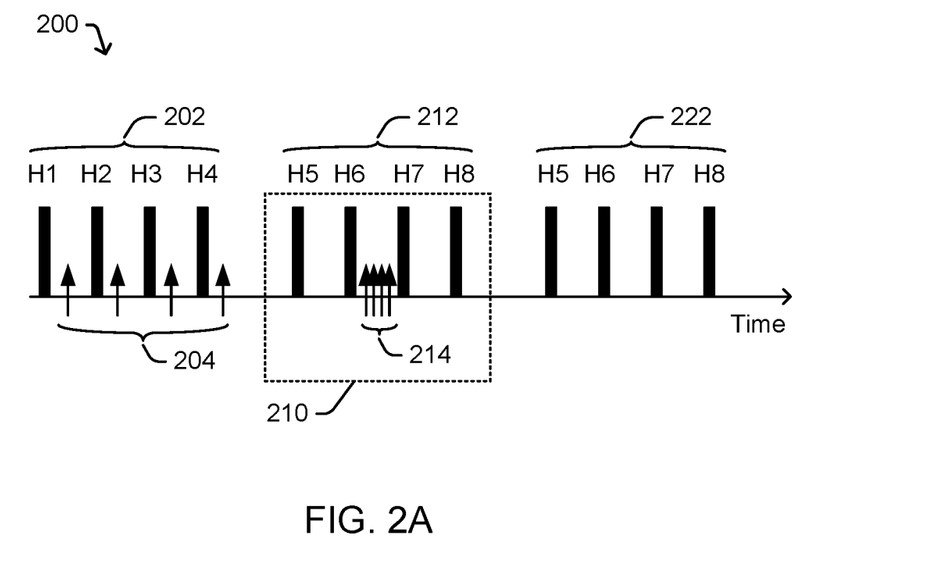
FIG. 2A is a timeline diagram illustrating example wireless signal reception and transmission before, during and after an autonomous tune-away period of time is performed by a UE, e.g., as in FIG. 1, in accordance with a first example implementation.
Figure 2B:
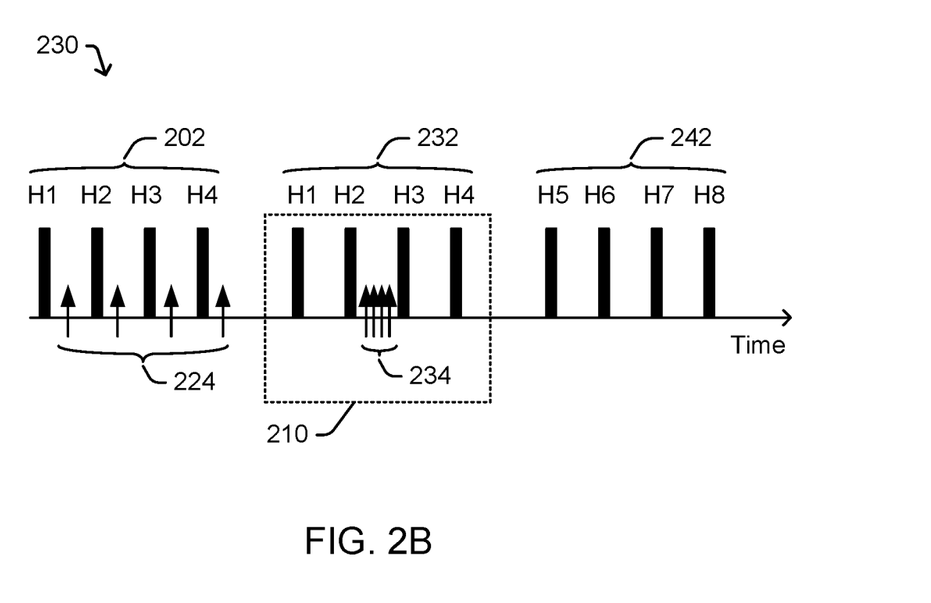
FIG. 2B is a timeline diagram illustrating example wireless signal reception and transmission before, during and after an autonomous tune-away period of time is performed by a UE, e.g., as in FIG. 1, in accordance with a second example implementation.

Attention is drawn next to FIGS. 2A and 2B which are illustrative timeline diagrams showing example autonomous TA periods of operation and example uplink and downlink signal transmissions, some of which occur prior to the autonomous TA period of operation, some that occur during at least a portion of the autonomous TA periods of operation, and some that occur after the autonomous TA periods of operation in accordance with certain aspects of the present description.

More specifically, FIG. 2A shows a timeline 200 corresponding to an autonomous TA period of operation represented by period 210 in reference to the indicated time axis. As shown, prior to the start of period 210, a first set of data units 202 comprising one or more data units of a positioning signal is transmitted by a first base station over a downlink to the UE. In this example, the first set of data units 202 is illustrated as comprising H1, H2, H3, and H4, which may comprise protocol data units (PDUs) associated with a HARQ operation supported by the UE. In this example, eight related PDUs, namely, H1 through H8, are provided as part of the example HARQ operation. In this example, two sets of data units, PDUs H1-H4 and PDUs H5-H8 may be transmitted and at times retransmitted as part of known HARQ operation or the like. A typical HARQ operation may make use of indications of reception comprising acknowledgements (ACKs) and negative acknowledgements (NACKs), such that if PDUs H1-H4 are ACKed by the UE then PDUs H5-H8 may be transmitted next, otherwise if PDUs H1-H4 are NACKed by the UE then PDUs H1-H4 may be retransmitted next. Hence, an ACK by the UE may signal to the transmitting device to continue the transmission process/sequence with newly transmitted PDUs, while a NACK (or possibly a lack of an ACK) by the UE may signal to the transmitting device s need to retransmit one or more PDUs.

With this in mind, a UE may transmit one or more indications of reception corresponding to one or more of the PDUs in the first set of data units 202 over an uplink to the first base station. Thus, for example, in timeline 200, arrows 204 may represent one or more indications of reception corresponding to one or more of the first set of data units 202. In this particular example, arrows 204 represent one or more indications comprising one or more ACKs corresponding to one or more of PDUs H1-H4. Such ACK(s) may indicate to the first base station that PDUs H1-H4 were determined to have been received by the UE, and hence that PDUs H1-H4 need not be retransmitted and that PDUs H5-H8 may be transmitted.

Next, at some point after the start of period 210, a second set of data units 212 of a positioning signal is transmitted by the first base station over a downlink to the UE. In this example, the second set of data units 212 comprises an initial (new) transmission of PDUs H5, H6, H7, and H8 of the previously mentioned HARQ operation supported by the UE. However, since the UE may be tuned-away from 'listening' to the first base station during period 210, this second set of data units 212 will not be received by the UE. Nevertheless, as represented by arrows 214, the UE may transmit one or more indications of reception, corresponding to one or more of the PDUs in the second set of data units 212, over an uplink to the first base station. Thus, for example, in timeline 200 arrows 214 may represent one or more indications of reception comprising one or more NACKs corresponding to one or more of PDUs H5-H8. Such NACK(s) may indicate to the first base station that one or more of PDUs H5-H8 were determined to have not been received by the UE, and hence that PDUs H5-H8 will need to be retransmitted.

A retransmission of PDUs H5-H8 is illustrated by a third set of data units 222, which are transmitted (for a second time) after the end of period 210. Thus, as timeline 200 shows, transmitting NACK(s) for PDUs H5-H8 during period 210, the UE may prompt the transmitting device to retransmit PDUs H5-H8 after period 210 when the UE has tuned back and may receive such third set of data units. This NACK transmission action may improve efficiency, for example, by reducing potential delays associated with the first base station determining due to a lack of response from the UE (e.g., during a threshold time since an earlier transmission) to retransmit PDUs H5-H8.

Turning next to FIG. 2B, a timeline 230 is illustrated in similar fashion as FIG. 2A, again with an autonomous TA period of operation represented by period 210 in reference to the indicated time axis. For example, prior to the start of period 210, a first set of data units 202 of a positioning signal is transmitted by a first base station over a downlink to the UE. Once again, the first set of data units 202 in this example are represented by PDUs H1, H2, H3, and H4 associated with a HARQ operation or the like supported by the UE. As in the preceding example, eight PDUs, namely, H1 through H8, are provided as part of the example HARQ operation, such that PDUs H1-H4 and PDUs H5-H8 represent specific sets of data units that may be transmitted/retransmitted as part of the HARQ operation.

In this example, it is assumed that the first set of data units 202 (PDUs H1-H4) were determined to have been received by the UE. Normally in such circumstances, the UE would transmit one or more ACKs in accordance with the HARQ operation. However, as represented by arrows 224, the UE in this example implementation may transmit one or more NACKs corresponding to one or more of PDUs H1-H4 over an uplink to the first base station. Thus, for example, in timeline 230 arrows 224 may represent one or more indications of reception comprising one or more NACKs corresponding to one or more of PDUs H1-H4. Such NACK(s) indicate to the first base station that one or more of PDUs H1-H4 were determined to have not been received by the UE, and hence that PDUs H1-H4 should be retransmitted (e.g., likely before PDUs H5-H8 are transmitted). Such NACK(s) may be considered to be a predetermined (here, false) indication of reception in situations wherein the first set of data units were actually determined to have been received by the UE. One purpose for such a predetermined indication is that the first base station may respond thereto by retransmitting the first set of data units during at least a portion of period 210. This is illustrated in timeline 230 by second set of data units 232 that may be transmitted by the first base station during period 210 while the UE is tuned-away. Here, for example, second set of data units is shown as comprising retransmitted PDUs H1-H4.

Once again, however, since the UE may be tuned-away from 'listening' to the first base station during period 210, the second set of data units 232 will not be received by the UE. Nevertheless, as represented by arrows 234, the UE may transmit one or more indications of reception, corresponding to one or more of the PDUs in the second set of data units 232, over an uplink to the first base station. Thus, for example, in timeline 230 arrows 234 may represent one or more indications of reception comprising one or more acknowledgements (ACKs) corresponding to the second set of data units. Such ACK(s) may indicate to the first base station that PDUs H1-H4 were determined to have been received by the UE, and hence possibly that PDUs H5-H8 may be newly transmitted as illustrated by third set of data units 242, as shown here after the end of period 210.

As illustrated in the two example timelines 200 and 230, although the UE is in an autonomous TA period of operation during period 210 it is configured to transmit one or more indications of reception corresponding to the second set of data units that the UE expects the transmitting device to send during period 210. As a result, as illustrated in these timelines, a desired sequence of transmitted data units (e.g., PDUs H1-H4 and then PDUs H4-H8) represented by first set of data units 202 and third set of data units 222 or 242 may be maintained even though the UE performed an autonomous TA period of operation.

It should be noted that an indication of reception corresponding to one or more data units in the examples represented by arrows 204, 214, 224, and 234 may be transmitted by the UE at various times depending upon the implementation. Thus, for example, in certain implementations as shown by arrows 204 and 224, an ACK or a NACK may be transmitted for each PDU, e.g., following attempted reception. In other implementations, particularly with regard to transmissions during period 210, it may be useful for the UE to specifically time a transmission of an ACK or a NACK to possibly influence subsequent PDU transmission timing. By way of example, as shown by arrows 214 and 234 one or more indications of reception may be transmitted at time(s) selected which may lead the transmitting device to transmit the third set of data units 222 or 242 after the end of period 210. So, for example, the one or more NACK(s) represented by arrows 214 or the one or more ACK(s) represented by arrows 234 may be transmitted in advance of one or more the PDUs being transmitted. Thus, a UE may determine when to transmit one or more indications of reception based, at least in part, on period 210. Indeed, in certain implementations, a UE may conversely determine a start or end or length of period 210 based, at least in part, on timing aspects relating to the on-going communication process between the first base station and the UE. Such considerations may reduce interruptions resulting from an autonomous tune-away.

While illustrated in the example timelines 200 and 230, the different sets of data units may comprise an equal number or plurality of PDU(s) in certain implementations, it should be understood that claimed subject matter need not be so limited.

Figure 3A:
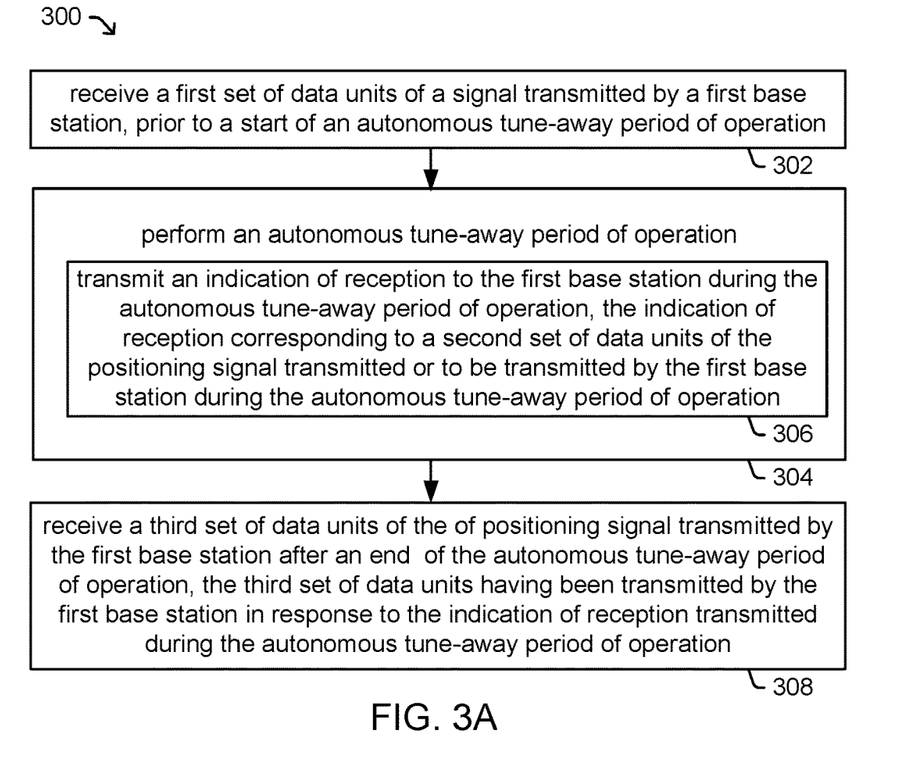
FIGS. 3A and 3B are block diagrams illustrating processes that may be performed by a UE, e.g., as in FIG. 1, in accordance with certain example implementations.

Reference is made next to FIG. 3A, which is a block diagram illustrating a process 300 that may be performed, at least in part, by a UE 102 or apparatus 104 provided therein (see FIG. 1)

At example block 302, a first set of data units of a positioning signal transmitted by a first base station may be received by a UE prior to a start of an autonomous TA period of operation. By way of example, block 302 may correspond to the transmission of first set of data units 202 in FIGS. 2A and 2B, associated with a HARQ operation or the like supported by the UE.

At example block 304, the UE may perform an autonomous TA period of operation. During at least a portion of the autonomous TA period of operation, a receiver of the UE may be momentarily tuned-away (or otherwise operatively modified) from receiving signals from a first base station to receive signals from a second base station. By way of example, block 304 may correspond to period 210 in FIGS. 2A and 2B. In certain implementations, the first base station may be unaware that the UE is performing the autonomous TA period of operation.

At example block 306, the UE may transmit an indication of reception to the first base station during the autonomous tune-away period of operation. The indication of reception corresponds to a second set of data units of the positioning signal transmitted or to be transmitted by the first base station during the autonomous TA period of operation. By way of example, block 306 may correspond to the transmission of one or more indications of reception represented by arrows 214 or 234 in FIGS. 2A and 2B corresponding, respectively, to second set of data units 212 or 232 associated with a HARQ operation or the like supported by the UE.

In certain example implementations, process 300 may comprise (e.g., at one or more of blocks 302, 304, 306) determining a number of data units or the like in the second set of data units based, at least in part, on a HARQ or other like supported aspect, a desired duration of an autonomous tune-away operation, or at least one network performance measurement, or the like or a combination thereof. For example, in certain instances, a number of data units in the second set may be determined, at least in part, on the HARQ or other like supported procedure, as illustrated in the examples in FIGS. 2A and 2B, wherein an example HARQ procedure uses two sets of four PDUS (shown as H1-H4 and H5-H8). In certain instances, a particular (desired) duration of an autonomous tune-away operation may correspond to a particular number of data units or the like in the second set of data units. In some instances, one or more network performance measurements may be taken into consideration in determining the number of data units or the like in the second set and/or a (desired) duration of the autonomous tune-away operation. For example, metrics (measured, estimated, or otherwise obtained) relating to the timing, bandwidth, and/or some other aspect of transmissions of PDUs from a particular base station may be considered, at least in part, in determining the number of data units in the second set and/or a duration of the autonomous tune-away operation.

Thus, by way further example, in certain instances, a UE may determine for how many PDUs to ACK or NACK during an autonomous tune-away period of operation based, at least in part, a network schedule, a gap length, etc. One potential benefit for determining the number of data units in the second set and/or the duration of an autonomous tune-away operation, e.g., as in the above examples, may be to initiate a particular response by the first base station with regard to the transmission of the third set of data units such that a delay following the autonomous tune-away operation may be reduced.

As previously described with regard to FIG. 2A, in certain example implementations, an indication of reception transmitted during an autonomous TA period of operation may comprise one or more NACKs intended to cause the first base station to retransmit the second set of data units after the autonomous TA period of operation has ended. As mentioned with regard to FIG. 2B, in certain example implementations, an indication of reception transmitted during an autonomous TA period of operation may comprise one or more ACKs intended to cause the first base station to not (once again) retransmit the second set of data units but rather to initially or newly transmit a third set of data units after the autonomous TA period of operation has ended.

With such examples in mind, at example block 308, the UE may receive a third set of data units of the of positioning signal transmitted by the first base station after an end of the autonomous tune-away period of operation. The third set of data units may have been transmitted by the first base station in response to the indication of reception transmitted by the UE (at block 306) during the autonomous tune-away period of operation.

Figure 3B:
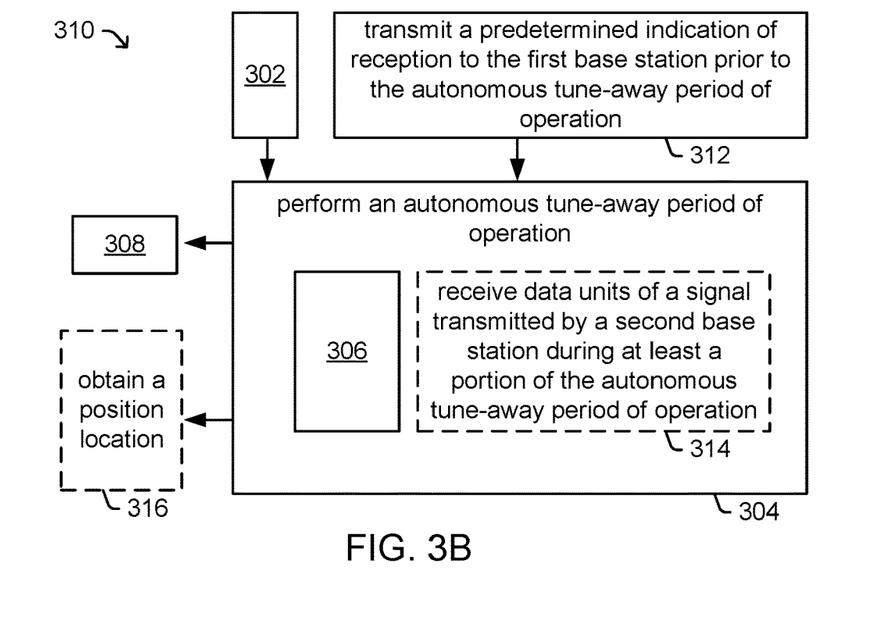

Reference is made next to FIG. 3B, which is a block diagram illustrating a process 310 that may be performed, at least in part, by a UE 102 or apparatus 104 provided therein (see FIG. 1). As illustrated, process 310 may comprise example blocks 302, 304, 306 and 308 of process 300 as described in the preceding example. Process 310 may further comprise one or more of example blocks 312 and 314, in certain implementations.

At example block 312, the UE may transmit, to the first base station, a predetermined indication of reception corresponding to the first set of data units (received at block 302) prior to a start of the autonomous TA period of operation. By way of example, block 312 may correspond to the transmission of one or more predetermined indications of reception represented by arrows 224 in FIG. 2B corresponding to first set of data units 202 associated with a HARQ operation or the like supported by the UE. As previously descripted, arrows 224 may comprise one or more NACKs which serve as a predetermined response, which in the example shown in timeline 230, indicate falsely that first set of data units 202 has not been determined to have been received by the UE.

At example block 314, the UE may receive data units of a signal transmitted by a second base station during at least a portion of the autonomous TA period of operation.

At example block 316, the UE may obtain a position that may be determined, at least in part, based on one or more signals received by the UE from one or more transmitting devices. For example, the one or more signals may comprise positioning reference signals (PRSs) that may be used for signal based position. The position may, in certain implementations, be determined, at least in part, by the UE. The position may in certain other implementations, be determined at least in part by one or more network or other like devices located external to the UE. Various techniques for signal based position are well known and beyond the scope of this description, but clearly applicable for use with the techniques presented herein.

Although that example blocks in FIGS. 3A and 3B are illustrated as having an apparent temporal order, it should be understood that some of these example process blocks may be rearranged and/or occur simultaneously or otherwise overlap in time.

Figure 4:
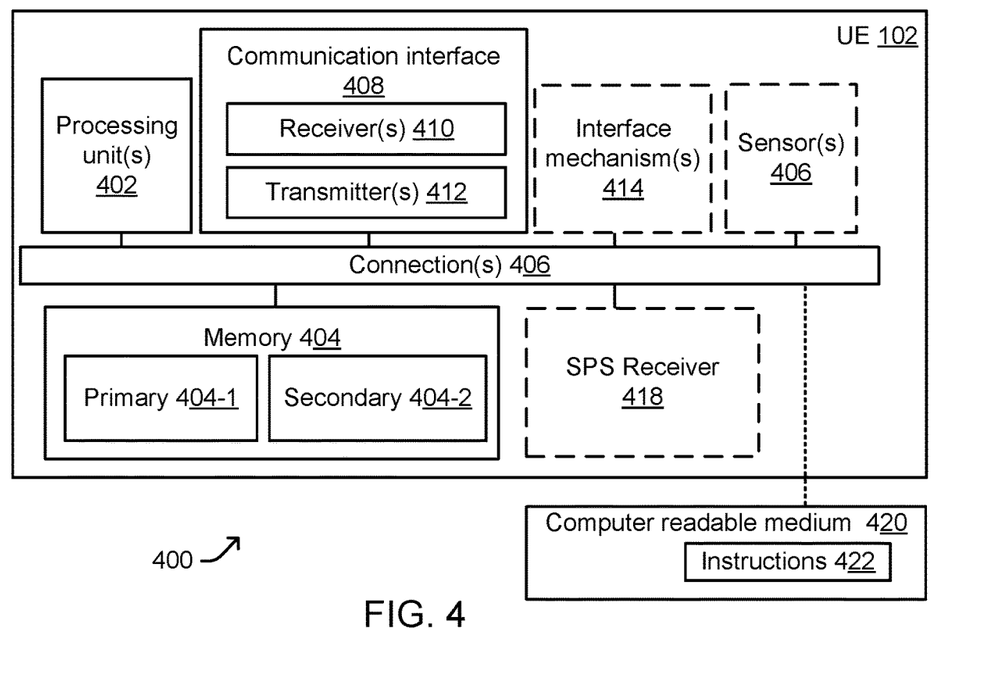
FIG. 4 is a block diagram illustrating some features of a UE, e.g., as in FIG. 1, in accordance with certain example implementations.

Attention is drawn next to FIG. 4, which is a schematic diagram illustrating certain features of an electronic device 400 comprising UE 102. It should be understood that the example features shown in electronic device 400 are not intended to show an exhaustive list of features that may be provided within a UE. Electronic device 400 may be configured, at least in part, to perform the techniques presented herein, for example, in accordance with the example timelines in FIGS. 2A and/or 2B, the processes in FIGS. 3A and/or 3B, or the like.

As illustrated, UE 102 may comprise one or more processing units 402 (e.g., to perform data processing in accordance with certain techniques provided herein) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process, including but not limited to processing of received assistance data, generating and/or applying a signal reception plan or the like with respect to at least one receiver, determining one or more indications of measuring capabilities, processing received signal data, initiating signal transmissions, accessing memory, executing instructions, estimating a position, etc. By way of example but not limitation, a processing unit may include some form of a system-on-a-chip (SOC), one or more processors, controllers, microprocessors, microcontrollers, application specific integrated circuits, digital signal processors, programmable logic devices, field programmable gate arrays, or the like, or any combination thereof. Processing unit(s) 402 may include but are not limited to general application processors and dedicated sensor processor(s). Processing unit(s) 402 may receive and analyze sensor measurements and initiate transmission and reception of data messages, control messages, measurements, etc., through communication interface 408 and/or through (optional) interface mechanisms 414. Processing unit(s) 402 may initiate the activation, de-activation and/or solicitation of various (optional) sensors 406 on UE 102.

Memory 404 may be representative of any non-transitory data storage mechanism. Memory 404 may include, for example, a primary memory 404-1 and/or a secondary memory 404-2. Primary memory 404-1 may comprise, for example, a random access memory, read only memory, etc. Memory 404 may store data representing various information (e.g., values, measurements), or various instructions, or the like. While illustrated in this example as being separate from the processing units, it should be understood that all or part of a primary memory may be provided within or otherwise co-located and coupled with a processing unit 402 or other like circuitry within the UE. Secondary memory 404-2 may comprise, for example, the same or similar type of memory as primary memory and/or one or more data storage devices or systems, such as, for example, a solid motion state memory drive, etc. In certain implementations, secondary memory may be operatively receptive of, or otherwise configurable to couple to, a non-transitory computer readable medium 420 (e.g., an article of manufacture). Memory 404 and/or non-transitory computer readable medium 420 may comprise, for example, executable instructions 422 for use in performing data processing, providing decision logic, scheduling, measuring, timing, instructing/commanding/controlling, etc., e.g., in accordance with the applicable techniques as provided herein.

Communication interface 408 may, for example, comprise one or more wired and/or wireless network interface units, radios, modems, etc., represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface 408 may, for example, be enabled for use with various wired communication networks, e.g., such as telephone system, a local area network, wired or wireless, an object or body-based network such as a network of Bluetooth or other short range transceivers connected to the body, a wide area network, a personal area network, an intranet, the Internet, etc.

In accordance with certain example implementations, communication interface 408 may, for example, be enabled for use with various wireless communication networks such as a wireless wide area network (WWAN), a wireless local area network (WLAN), a wireless personal area network (WPAN), an object or body-based network, (such as a local Bluetooth network), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include generational family technologies (e.g., "4G", "5G", etc.), such as, for example, Long Term Evolution (LTE), Advanced LTE, WiMAX, Ultra Mobile Broadband (UMB), and/or the like. Additionally, communication interface(s) 208 may further provide for infrared-based communications with one or more other devices. A WLAN may, for example, comprise an IEEE 802.11x network, and a WPAN may comprise a Bluetooth network, an IEEE 802.15x, for example. A WPAN may be used to interconnect multiple UEs on the same person or in the nearby environment, such as those utilized to communicate between various UEs on a person or object to send and receive sensor data, commands, battery indications and other UE information and/or commands. Wireless communication implementations described herein may also be used in connection with any combination of WWAN, WLAN or WPAN.

Representative interface mechanism 414 may, for example, comprise one or more input and/or output units that may be used to obtain inputs from and/or provide outputs to one or more other devices and/or a user. Thus, for example, interface mechanism 414 may comprise various buttons, switches, a touch pad, a trackball, a joystick, a touch screen, a keyboard, a microphone, a camera, an eye tracker, a fingerprint scanner, and/or the like, which may be used to receive one or more user inputs or other like inputs. In certain instances, interface mechanism 414 may comprise various devices that may be used in producing a visual output, an audible output, and/or a tactile output for a user. For example, interface mechanism 414 may be used to present a video display, graphical user interface, positioning and/or navigation related information, visual representations of electronic map, routing directions, etc., via a display mechanism and/or audio mechanism.

Representative sensor(s) 406 may represent one or more environmental sensors, such as, e.g., a magnetometer or compass, a barometer or altimeter, etc., and which may be useful for positioning and/or determining a certain movements. For example, sensor(s) 406 may represent one or more inertial sensors, which may be useful in detecting certain movements. Thus, for example, sensor(s) 406 may comprise one or more accelerometers, one or one or more gyroscopes. In some implementations sensor(s) 406 may comprise and/or take the form of one or more input devices such as a sound transducer, a microphone, a camera, a light sensor, etc.

In certain instances, sensor(s) 406 may generate analog or digital signals that may be stored in memory 404 and processed by DPS(s) (not shown) or processing unit(s) 402 in support of one or more applications such as, for example, applications directed to positioning or navigation operations based, at least in part, on one or more positioning functions.

In certain instances, UE 102 may comprise a satellite positioning system (SPS) receiver 418 for acquiring SPS signals 121 (see FIG. 1) via one or more antennas (not shown). SPS receiver 818 may also process, in whole or in part, acquired SPS signals 121 for estimating a position and/or a motion of the UE. In certain instances, SPS receiver 418 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of the UE. In certain implementations, all or part of such processing of acquired SPS signals may be performed by other processing capabilities in a UE, e.g., processing unit(s) 402, memory 404, etc., in conjunction with SPS receiver 418. Storage of SPS or other signals for use in performing position may be performed in memory 404 or registers (not shown).

Processing unit(s) 402 or communication interface 408 may comprise a dedicated modem processor or the like that may be capable of performing baseband processing of signals acquired and down converted at receiver(s) 410 of communication interface 408 or SPS receiver 418. Similarly, a modem processor or the like may perform baseband processing of signals to be up converted for transmission by (wireless) transmitter(s) 412. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, UEs, transmitting devices, environments, etc.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for use in a user equipment (UE), the method comprising, at the UE:
   receiving a first set of data units of a signal transmitted by a first base station, prior to a start of an autonomous tune-away operation;
   performing the autonomous tune-away operation;
   determining a number of data units in a second set of data units based, at least in part, on a desired duration of the autonomous tune-away operation, at least one network performance measurement, or a combination thereof;
   transmitting an indication of reception to the first base station during the autonomous tune-away operation, the indication of reception corresponding to the second set of data units of the signal transmitted or to be transmitted by the first base station during the autonomous tune-away operation; and
   receiving a third set of data units of the signal transmitted by the first base station after an end of the autonomous tune-away operation, the third set of data units having been transmitted by the first base station in response to the indication of reception transmitted during the autonomous tune-away operation.

2. The method of claim 1, wherein the indication of reception comprises a negative acknowledgment (NACK) indicating that at least one data unit in the second set of data units needs to be retransmitted by the first base station, and the third set of data units comprises a retransmission of the second set of data units.

3. The method of claim 1, and further comprising, at the UE:
   transmitting a predetermined indication of reception to the first base station prior to the autonomous tune-away operation, the predetermined indication of reception corresponding to the first set of data units and comprising a negative acknowledgment (NACK) indicating that at least one data unit in the first set of data units needs to be retransmitted by the first base station, and
   wherein the indication of reception transmitted to the first base station during the autonomous tune-away operation comprises an acknowledgment (ACK) corresponding to at least one data unit in the second set of data units, and the second set of data units comprises a retransmission of the first set of data units.

4. The method of claim 1, wherein the first set of data units, the second set of data units and the third set of data units comprise protocol data units (PDUs) that are being provided to the UE by the first base station based, at least in part, on a Hybrid Automatic Repeat Request (HARQ) operation supported by the UE, and the first set of data units, the second set of data units and the third set of data units each comprise an equal plurality of PDUs.

5. The method of claim 1, wherein the first set of data units and the third set of data units are configured for the UE to decode a single data unit based on one of the data units from the first set of data units and one of the data units from the third set of data units.

6. The method of claim 1, wherein the indication of reception comprises either an acknowledgement (ACK) or a negative acknowledgement (NACK) corresponding to a Hybrid-Automatic Repeat Request (HARQ) operation supported by the UE.

7. The method of claim 1, wherein the indication of reception is transmitted prior to the at least one of the data units of the second set of data units being transmitted by the first base station.

8. The method of claim 1, and further comprising, at the UE:
   receiving a second signal transmitted by a second base station during at least a portion of the autonomous tune-away operation.

9. The method of claim 8, wherein the second signal comprises a positioning reference signal (PRS).

10. A user equipment (UE) comprising:
    a receiver;
    a transmitter; and
    one or more processing units coupled to the receiver and the transmitter and configured to:
       obtain, via the receiver, a first set of data units of a signal transmitted by a first base station, prior to a start of an autonomous tune-away operation;
       initiate the autonomous tune-away operation;
       determine a number of data units in a second set of data units based, at least in part, on a desired duration of the autonomous tune-away operation, at least one network performance measurement, or a combination thereof;
       initiate transmission of an indication of reception to the first base station during the autonomous tune-away operation, the indication of reception corresponding to the second set of data units of the signal transmitted or to be transmitted by the first base station during the autonomous tune-away operation; and
       obtain, via the receiver, a third set of data units of the signal transmitted by the first base station after an end of the autonomous tune-away operation, the third set of data units having been transmitted by the first base station in response to the indication of reception transmitted during the autonomous tune-away operation.

11. The UE of claim 10, wherein the indication of reception comprises a negative acknowledgment (NACK) indicating that at least one data unit in the second set of data units needs to be retransmitted by the first base station, and the third set of data units comprises a retransmission of the second set of data units.

12. The UE of claim 10, wherein the one or more processing units is further configured to initiate transmission of a predetermined indication of reception to the first base station prior to the autonomous tune-away operation, the predetermined indication of reception corresponding to the first set of data units and comprising a negative acknowledgment (NACK) indicating that at least one data unit in the first set of data units needs to be retransmitted by the first base station, and wherein the indication of reception transmitted to the first base station during the autonomous tune-away operation comprises an acknowledgment (ACK) corresponding to at least one data unit in the second set of data units, and the second set of data units comprises a retransmission of the first set of data units.

13. The UE of claim 10, wherein the first set of data units, the second set of data units and the third set of data units comprise protocol data units (PDUs) that are being provided to the UE by the first base station based, at least in part, on a Hybrid Automatic Repeat Request (HARQ) operation supported by the UE, and the first set of data units, the second set of data units and the third set of data units each comprise an equal plurality of PDUs.

14. The UE of claim 10, wherein the indication of reception comprises either an acknowledgement (ACK) or a negative acknowledgement (NACK) corresponding to a Hybrid-Automatic Repeat Request (HARQ) operation supported by the UE.

15. The UE of claim 10, wherein the indication of reception is transmitted prior to the at least one of the data units of the second set of data units being transmitted by the first base station.

16. The UE of claim 10, wherein the one or more processing units is configured to obtain, via the receiver, a second signal transmitted by a second base station during at least a portion of the autonomous tune-away operation, and wherein the second signal is configured for use in position determination.

17. An apparatus for use in a user equipment (UE), the apparatus comprising:
means for receiving a first set of data units of a signal transmitted by a first base station, prior to a start of an autonomous tune-away operation;
means for performing the autonomous tune-away operation;
means for determining a number of data units in a second set of data units based, at least in part, on a desired duration of the autonomous tune-away operation, at least one network performance measurement, or a combination thereof;
means for transmitting an indication of reception to the first base station during the autonomous tune-away operation, the indication of reception corresponding to the second set of data units of the signal transmitted or to be transmitted by the first base station during the autonomous tune-away operation; and
means for receiving a third set of data units of the signal transmitted by the first base station after an end of the autonomous tune-away operation, the third set of data units having been transmitted by the first base station in response to the indication of reception transmitted during the autonomous tune-away operation.

18. The apparatus of claim 17, and further comprising means for receiving data units of a signal transmitted by a second base station during at least a portion of the autonomous tune-away period of operation.

19. The apparatus of claim 17, wherein the indication of reception comprises a negative acknowledgment (NACK) indicating that at least one data unit in the second set of data units needs to be retransmitted by the first base station, and the third set of data units comprises a retransmission of the second set of data units.

20. The apparatus of claim 17, and further comprising means for transmitting a predetermined indication of reception to the first base station prior to the autonomous tune-away operation, the predetermined indication of reception corresponding to the first set of data units and comprising a negative acknowledgment (NACK) indicating that at least one data unit in the first set of data units needs to be retransmitted by the first base station, and wherein the indication of reception transmitted to the first base station during the autonomous tune-away operation comprises an acknowledgment (ACK) corresponding to at least one data unit in the second set of data units, and the second set of data units comprises a retransmission of the first set of data units.

21. The apparatus of claim 17, wherein the indication of reception comprises either an acknowledgement (ACK) or a negative acknowledgement (NACK) corresponding to a Hybrid-Automatic Repeat Request (HARQ) operation supported by the UE.

22. The apparatus of claim 17, wherein the indication of reception is transmitted prior to the at least one of the data units of the second set of data units being transmitted by the first base station.

23. An article of manufacture comprising a non-transitory computer readable medium having stored therein instructions executable by one or more processing units of a user equipment (UE) to:
obtain a first set of data units of a signal transmitted by a first base station, prior to a start of an autonomous tune-away operation;
perform the autonomous tune-away operation;
determine a number of data units in a second set of data units based, at least in part, on a desired duration of the autonomous tune-away operation, at least one network performance measurement, or a combination thereof;
initiate transmission of an indication of reception to the first base station during the autonomous tune-away operation, the indication of reception corresponding to the second set of data units of the signal transmitted or to be transmitted by the first base station during the autonomous tune-away operation; and
obtain a third set of data units of the signal transmitted by the first base station after an end of the autonomous tune-away operation, the third set of data units having been transmitted by the first base station in response to the indication of reception transmitted during the autonomous tune-away operation.

24. The article of claim 23, wherein the indication of reception comprises a negative acknowledgment (NACK) indicating that at least one data unit in the second set of data units needs to be retransmitted by the first base station, and the third set of data units comprises a retransmission of the second set of data units.

25. The article of claim 23, and further comprising instructions executable by the one or more processing units to initiate transmission of a predetermined indication of reception to the first base station prior to the autonomous tune-away operation, the predetermined indication of reception corresponding to the first set of data units and comprising a negative acknowledgment (NACK) indicating that at least one data unit in the first set of data units needs to be retransmitted by the first base station, and wherein the indication of reception transmitted to the first base station during the autonomous tune-away operation comprises an acknowledgment (ACK) corresponding to at least one data unit in the second set of data units, and the second set of data units comprises a retransmission of the first set of data units.

26. The article of claim 23, and further comprising instructions executable by the one or more processing units to obtain a second signal transmitted by a second base station during at least a portion of the autonomous tune-away operation.

\* \* \* \* \*